(12) United States Patent
Hui

(10) Patent No.: US 12,067,797 B2
(45) Date of Patent: Aug. 20, 2024

(54) PRODUCT LABELING REVIEW

(71) Applicant: PEPSICO, INC., Purchase, NY (US)

(72) Inventor: Jingting Hui, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 379 days.

(21) Appl. No.: 17/408,181

(22) Filed: Aug. 20, 2021

(65) Prior Publication Data

US 2022/0058385 A1    Feb. 24, 2022

Related U.S. Application Data

(60) Provisional application No. 63/068,064, filed on Aug. 20, 2020.

(51) Int. Cl.
| | |
|---|---|
| G06V 30/10 | (2022.01) |
| G06F 16/35 | (2019.01) |
| G06F 16/38 | (2019.01) |
| G06F 40/12 | (2020.01) |
| G06F 40/183 | (2020.01) |
| G06V 30/413 | (2022.01) |
| G06V 30/414 | (2022.01) |

(52) U.S. Cl.
CPC ............ *G06V 30/414* (2022.01); *G06F 16/35* (2019.01); *G06F 16/381* (2019.01); *G06F 40/12* (2020.01); *G06F 40/183* (2020.01); *G06V 30/413* (2022.01); *G06V 30/10* (2022.01)

(58) Field of Classification Search
CPC ...... G06V 30/10; G06V 30/153; G06V 30/36; G06V 30/412; G06V 30/1448; G06F 18/22; G06F 40/183; G06F 16/381
See application file for complete search history.

(56) References Cited

U.S. PATENT DOCUMENTS

| | | | |
|---|---|---|---|
| 11,068,715 B1* | 7/2021 | Zuo ................... | G06Q 30/0627 |
| 2012/0005222 A1* | 1/2012 | Bhagwan ............ | G06F 16/5838 |
| | | | 707/769 |
| 2017/0041407 A1* | 2/2017 | Wilbur .................. | G06Q 50/02 |
| 2020/0175267 A1* | 6/2020 | Schäfer ............... | G06V 30/413 |

(Continued)

OTHER PUBLICATIONS

International Search Report issued on Jan. 27, 2022 in PCT/IB2021/00577.

(Continued)

*Primary Examiner* — Emily C Terrell
*Assistant Examiner* — Ahmed A Nasher
(74) *Attorney, Agent, or Firm* — Barnes & Thornburg LLP; Dominic Yobbi

(57) ABSTRACT

A label processing engine receives, as inputs, raw data representative of a label and baseline data, detects a raw data object within the raw data, classifies the raw data object, and localizes the raw data object within the raw data, detects a baseline data object within the baseline data, classifies the baseline data object, and localizes the baseline data object within the baseline data. The engine recognizes corresponding text within the raw data object and the baseline data object and extracts the corresponding text within the raw data object and the baseline data object, reassembles the corresponding text of the raw data object and the baseline data object into respective lines of text, compares the respective lines of text with one another, and issues a notification based on the comparison.

19 Claims, 17 Drawing Sheets

(56) References Cited

U.S. PATENT DOCUMENTS

2021/0142092 A1* 5/2021 Zhao .................... G06K 7/1447
2023/0205800 A1* 6/2023 Avivi ..................... G06F 16/35
382/176

OTHER PUBLICATIONS

Written Opinion issued on Jan. 27, 2022 in PCT/IB2021/00577.
Matsunaga et al., "Image Processing for the Extraction of Nutritional Information from Food Labels," Computer Engineering Senior Theses, Jun. 9, 2015, retrieved from the Internet: https://scholarcommons.scu.edu/cgi/viewcontent.cgi?article=1041&context=cseng_senior (retrieved Jan. 1, 2014), pp. 7-14.
Reibring, "Photo OCR for Nutrition Labels—Combining Machine Learning and General Image Processing for Text Detection of American Nutrition Labels," Master's Thesis in Complex Adaptive Systems, May 2017, retrieved from the Internet: https: //odr.chalmers.se/bitstream/20.500.12380/256649/1/256649.pdf (retrieved Jan. 14, 2022), pp. 1-3, 11-20, 28, 29.

* cited by examiner

LABEL INFO TABLE — 1500

| NAME | VALUE |
|---|---|
| Language | Arabic-Only |
| Brand | 7 up |
| Volume | 1 Liter |
| Market | Riyadh - Saudi Arabia |

INGREDIENTS TABLE — 1502

| KEY | Arabic Text | English Text | Asterisk Foot Note Reference |
|---|---|---|---|
| Ingredients : list of ingredient | المصنوعة منكوك المياه ، سكر ، ثاني أكسيد الكربون ، منكه ، حمض الستريك (E330) ، سترات الصوديوم (E331) ، بنزوات الصوديوم (E211) (مادة حافظة) ، الألوان الطبيعية (الكركمين E100 (ب) E122) | | |

NUTRITION FACT TABLE — 1504

| Fact_Part | Asterisk Foot Note Reference | Unit Percent | DV Value | Arabic_Unit Value | Arabic Text | YES/NO | English Unit | English Text |
|---|---|---|---|---|---|---|---|---|
| Nutrition Fact | | | | | حقائق غذائية | | | |
| Number of servings per container (multi serve) | | | | | عدد الحصص في العبوة: 4 | YES | | |
| Number of servings per container (single serve) | | | | | حجم الحصة كل العبوة | NO | | |
| serving size | | | | مل 250 | حجم الحصة | | | |
| Amount per serving | | | | مل 250 | الكمية لكل حصة | | | |
| Calories | | | | 44 | السعرات الحرارية | | | |
| % Daily Value | ** | | | | % القيمة اليومية | | | |
| Total Fat | | % | 0 | غ 0 | الدهون الكلية | | | |
| Saturated Fat | | % | 0 | غ 0 | الدهون المشبعة | | | |
| Sodium | | % | 1 | مغ 23 | الصوديوم | | | |
| Total Carbohydrate | | % | 4 | غ 11 | الكربوهيدرات الكلية | | | |
| Dietary Fiber | | % | 0 | غ 0 | الألياف الغذائية | | | |
| Total Sugars | | | | غ 11 | السكريات الكلية | | | |
| Added Sugars | | % | 22 | غ 11 | السكر المضاف | | | |
| protein | | % | 0 | غ 0 | البروتين | | | |
| Caffeine | | | 0 | غ 0 | الكافيين | | NO | |
| DV (Daily Value) Footer | ** | | | | تعتمد نسبة القيمة اليومية على المدخول اليومي من 100 مل من المشروب أو الطعام ، إلخ | | | |

KEY — 1506

| KEY | Arabic Text | English Text |
|---|---|---|
| Product Description | مشروب غازي بنكهة الكولا | |

FIG. 15

PRODUCT LABELING REVIEW

CROSS-REFERENCE TO RELATED APPLICATION

This application claims priority from a provisional application U.S. Ser. No. 63/068,064 filed Aug. 20, 2020 the disclosure of which is incorporated herein in its entirety.

TECHNICAL FIELD

The present disclosure generally relates to systems and methods for improving product labeling review.

BACKGROUND

An artwork label affixed on a product contains a great deal of information of interest to the consumer. For example, the label informs consumers of a name of the product and a logo for a manufacturer or distributor brand. Other information on the label may include units of measurement that denotes the size, quantity or weight of the item, a short description, or tag line. Labels can also include a list of ingredients, a product story, directions for use, and other information. Generally, all the information on the label must be reviewed to ensure it is correct. However, reviewing the information is very time consuming and prone to human error.

SUMMARY

A system for analyzing a product label includes a label processing engine to receive a first input including raw data representative of the label and a second input including baseline data, detect a raw data object within the raw data, classify the raw data object into a first class of a plurality of classes by associating the raw data object with the first class, and localize the raw data object within the raw data. The label processing engine also detects a baseline data object within the baseline data, classifies the baseline data object into a second class of the plurality of classes by associating the baseline data object with the second class, and localizes the baseline data object within the baseline data. The label processing engine further recognizes corresponding text within the raw data object and the baseline data object and extract the corresponding text within the raw data object and the baseline data object, reassembles the corresponding text of the raw data object and the baseline data object into respective lines of text, compares the respective lines of text with one another, and one of, issues a first notification indicating that the respective lines of text match in response to determining that the respective lines of text match, and issues a second notification indicating that the respective lines of text do not match in response to determining that the respective lines of text do not match.

A method for processing a product label includes receiving, by a label processing engine, a first input including raw data representative of the label and a second input including baseline data, detecting a raw data object within the raw data, classifying the raw data object into a first class of a plurality of classes by associating the raw data object with the first class, and localizing the raw data object within the raw data. The method also includes detecting a baseline data object within the baseline data, classifying the baseline data object into a second class of the plurality of classes by associating the baseline data object with the second class, and localizing the baseline data object within the baseline data. The method further includes recognizing corresponding text within the raw data object and the baseline data object and extracting the corresponding text within the raw data object and the baseline data object, reassembling the corresponding text of the raw data object and the baseline data object into respective lines of text, comparing the respective lines of text with one another, and one of, issuing a first notification indicating that the respective lines of text match in response to determining that the respective lines of text match, and issuing a second notification indicating that the respective lines of text do not match in response to determining that the respective lines of text do not match.

A system for processing a product label includes an object detection module configured to, in response to receiving a raw data input and a baseline data input, detect corresponding objects within data of each of the data inputs, and classify the corresponding objects using a customized object detection model. The system also includes, a text recognition module configured to, in response to receiving the corresponding objects, recognize text in each of the corresponding objects and extract the text to classify the text using a customized classification model. The system further includes and a content comparison module configured to compare the text of the corresponding objects with one another, using a character-by-character approach, and issue a notification in response to identifying a discrepancy.

BRIEF DESCRIPTION OF THE DRAWINGS

The detailed description refers to the following figures, in which:

FIG. 7 is a block diagram illustrating an exemplary report layout for the machine learning-based product label review process;

FIG. 8 is a block diagram illustrating an exemplary baseline information document;

FIG. 15 is a block diagram illustrating an exemplary baseline information document for use during machine learning-based review of the exemplary product label of FIG. 9.

DETAILED DESCRIPTION

Accuracy of a product label must be carefully confirmed. An inaccurate product label or a product label with typographical or other errors, can result in costly product recall and label rework. A team of dedicated reviewers must, therefore, conduct regular review of product labels. Hiring such experts may be costly to the manufacturer due to the unique skillset it requires. Another challenge to the producer may be to employ a sizeable team of such product label review specialists to avoid introducing delays into target production timelines. Thus, automating the label review process is a high priority. However, existing text recognition programs frequently used for character identification are often unable to accurately recognize critical parts of a typical product and nutrition label. Further, traditional text recognition technology yields unsatisfactory results when applied to non-Latin script, whether alone or in combination with Latin-based language script, and to script of languages written from right to left, such as Arabic, Hebrew, Farsi, and Kurdish, as just some examples.

An example system for improved automated label review process may be configured to benchmark information in a product label against a core database using machine learning models. An automated label review system may use machine learning techniques to automatically identify a plurality of components to be reviewed within the artwork label, detect (or recognize) and extract text from the components identified within the artwork label, and compare the extracted text of the artwork label to text identified in the baseline data source. As such, an automated review application based on the present disclosure may rely on machine learning to enable seamless cooperation between a back end engine and a user-friendly interface to vastly improve the speed and accuracy of the artwork review process. In particular, the tool of the present disclosure does not require live font or text in order to extract the text from the label, the text can be part of the images.

Figure 1:
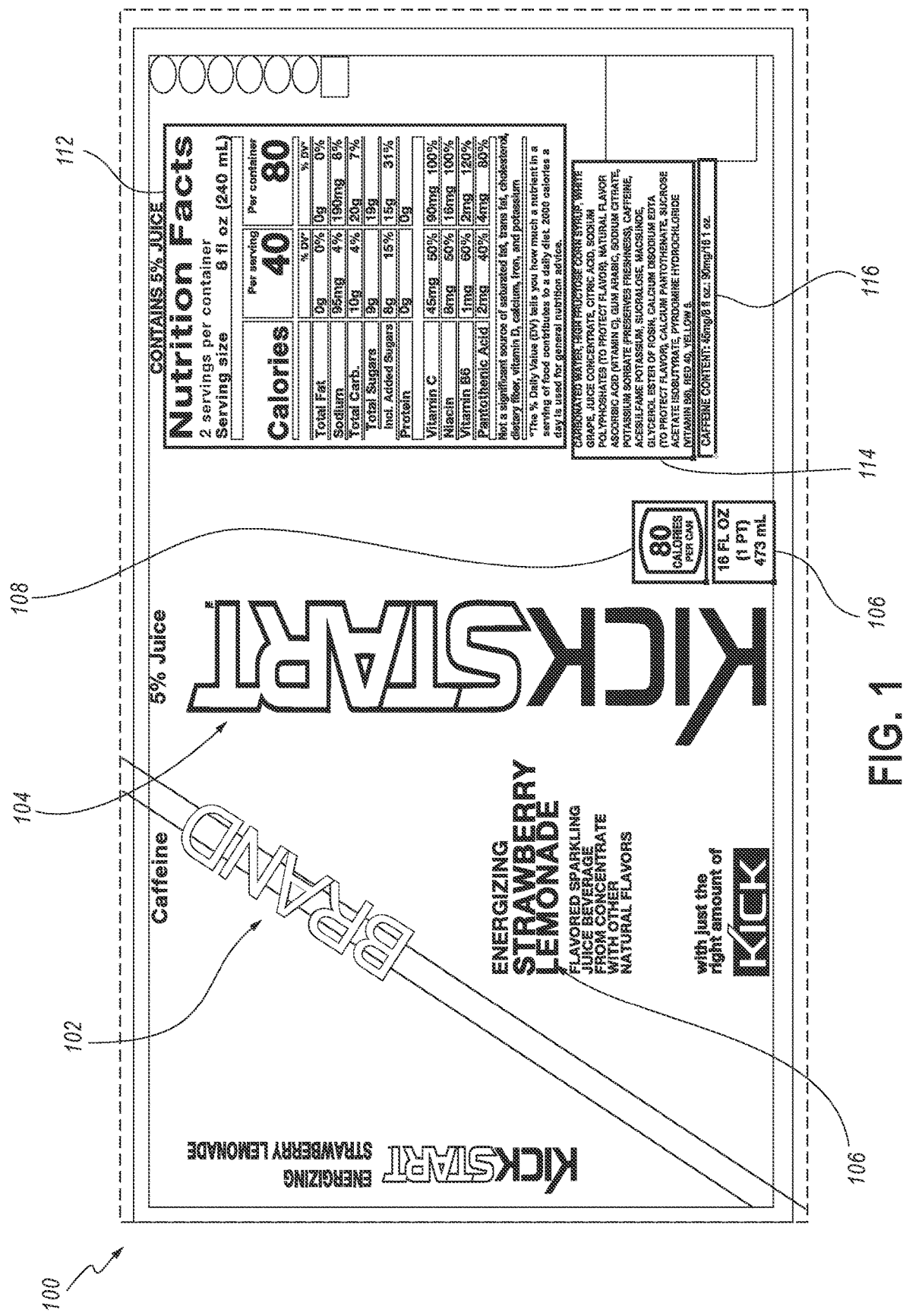
FIG. 1 is a block diagram illustrating an exemplary product label.

FIG. 1 illustrates an exemplary product label (hereinafter, artwork label) 100 including a plurality of label areas, such as, but not limited to, a brand logo 102, a product name 104, a product tagline (also referred to as a "statement of identity") 106, a thumbnail 108, a net content portion 110, and a nutrition facts box 112, and an ingredients list 114. Other examples of analyzed label areas include a recycling program logo, a "Keep Your City Clean" program logo, a packaging identifier, one or more caution statements, one or more trademark symbols, a one or more social media contact web addresses, a bottler address, suggested or required storage conditions, an expiration date statement, product description, label design center information, label artwork information, and label approver information.

Figure 9:
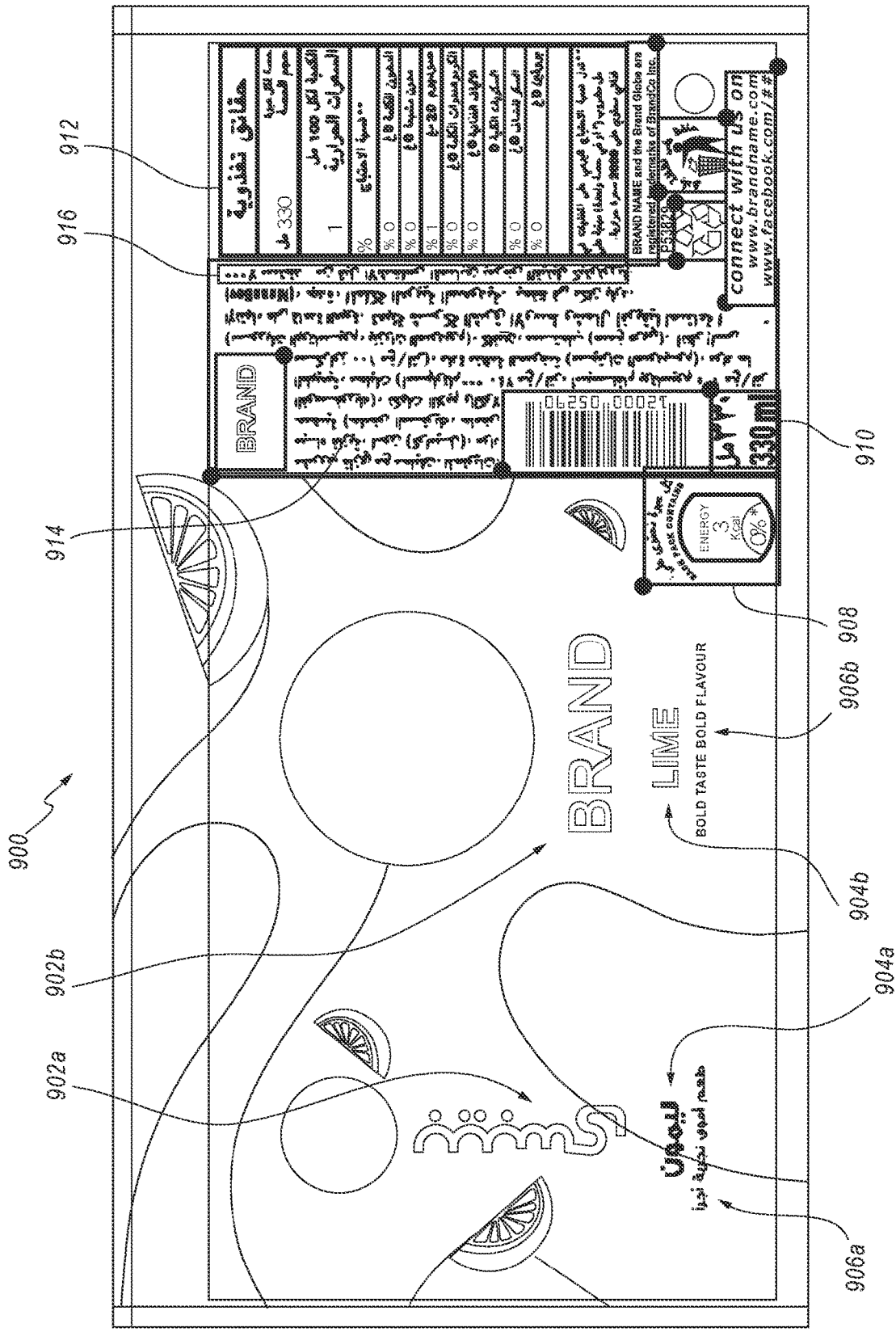
FIG. 9 is a block diagram illustrating an exemplary product label including one or more special characters in combination with Latin and non-Latin script and/or script written right-to-left.

FIG. 9 illustrates an exemplary product label including a combination of Latin and non-Latin script (hereinafter, non-Latin artwork label) 900 including a plurality of label areas, such as, but not limited to, a non-Latin script brand name 902a, a Latin script brand name 902b, non-Latin and Latin script product names 904a, 904b, non-Latin and Latin script product tagline 906a, 906b, a non-Latin and Latin script thumbnail 908, a non-Latin and Latin script net content portion 910, a non-Latin and Latin script nutrition facts box 912, and a non-Latin and Latin script ingredients list 914. The ingredient list (also referred to as "ingredient line") 914 may include a list of ingredients, a bottler/packager address, an expiry date statement, one or more caution statements, and a statement regarding recommended product storage conditions.

In other examples, the label 100, 900 may include more or fewer components and/or components arranged in a similar or different ways with respect to one another. One or more components of the label 100, 900 may be subject to country, federal, state, and/or other rules and regulations and may be required to comply with font type, style, size, amount of detail, and other specifications.

Further, portions of the label 100 may be subject to one or more business rules. For example, if a given label includes one or more predefined food coloring colors (e.g., a light yellow), then the label may be checked for one or more predefined caution statements 116, 916. As another example, if a list of ingredients of a given label includes artificial sweetener (e.g., aspartame), then the ingredient list may be checked to ensure that a quantity specifying an amount of artificial sweetener contained in the product immediately follows the listing of the ingredient, as may be required under the guidelines of some regions, and/or checked for a caution statement 116, 916 related to the artificial sweetener. As still another example, if a list of ingredients of a label includes caffeine, then the ingredient list may be checked for a corresponding caution statement 116, 916, and/or a quantity specifying an amount of caffeine present in the product. Business rules may vary across geographical regions and label review process of the present disclosure enables automating careful consideration and cross-checking whether a given business/regulatory rule applies to a region, country, or territory for which the label is intended and, if the business/regulatory rule, indeed, applies, determine whether markings of the label meet the requirements of the business/regulatory rule.

The thumbnail 108, 908 indicates a caloric value per container of the product and may be disposed on a customer-facing portion of the product for easy visual reference. The net content portion 110, 910 indicates net weight or net volume of the product and may provide weight and volume values in several different units and/or measurement systems, such that the same label 100, 900 may be applied to products distributed in a number of different regions. Contents and layout of the nutrition facts box 112, 912 may be subject to federal regulations and may provide food product's nutrient content, such as the amount of fat, sugar, sodium and fiber the product has. The ingredients list 114, 914 includes a list of every ingredient the food product contains listed in order of decreasing predominance.

Figure 8:
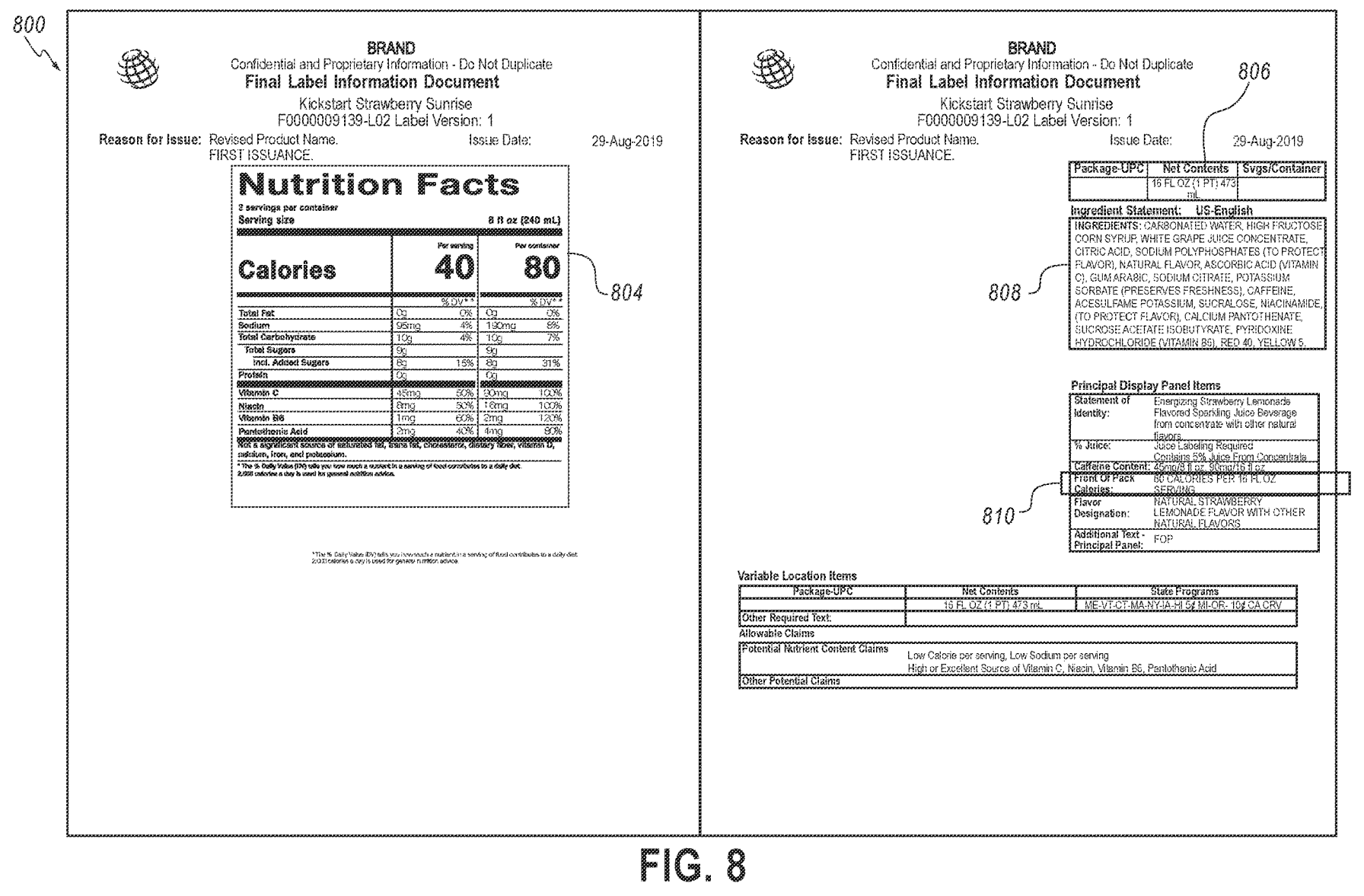

The product label 100, 900 may be reviewed for accuracy against one or more baseline data sources. FIGS. 8 and 15 illustrate exemplary baseline documents 800 and 1500, respectively. The exemplary baseline document 800 includes one or more nutrition information components of the product label as intended to be conveyed by the manufacturer or producer. The exemplary baseline document 800 may comprise a label information document (LID) 802 that includes a baseline nutrition facts box 804, a baseline net contents portion 806, a baseline ingredients list 808, and a baseline thumbnail 810. As illustrated, for example, in FIG. 15, the baseline document 1500 may include a plurality of tables, such as, a baseline label information table 1502, a baseline ingredients table 1504, a baseline nutrition fact table 1506, and a baseline product description table 1508. Each of the baseline tables 1502, 1504, 1506, and 1508 may include one or more columns and one or more rows indicating content of a portion of the product label as intended to be conveyed by the manufacturer or producer. Separate baseline documents, such as documents 800 and 1500, may be generated based on a language, or a combination of languages, used on the product label, based on a geographic region or territory where the product is intended to be distributed, and/or based on a brand of the product, a size of the product as measured in volume, mass, a number of servings per unit and so on. Additionally or alternatively, a single baseline document may provide several versions of contents of one or more label components, e.g., contents of the baseline label information table in in several languages.

Figure 2:
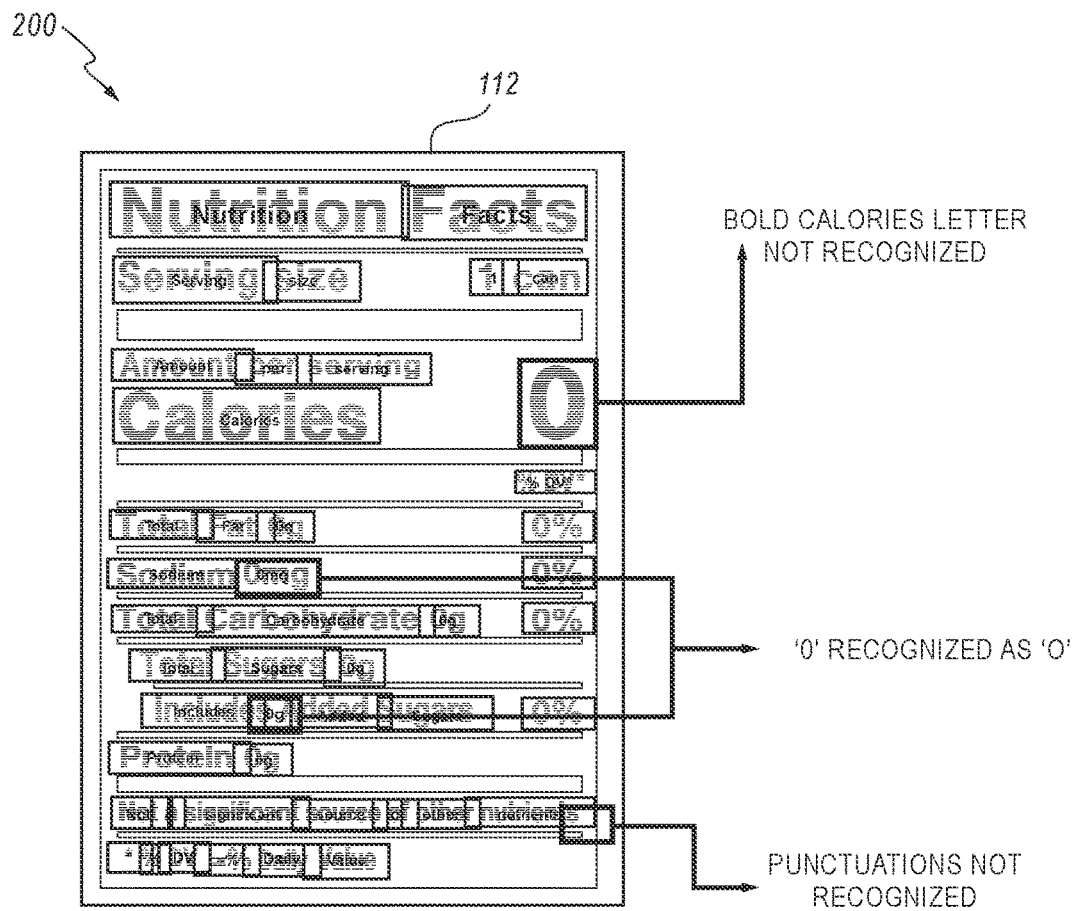
FIG. 2 is a block diagram illustrating an exemplary representation of a software-driven text extraction of text of the label of FIG. 1.

FIG. 2 illustrates an exemplary representation 200 of a software-driven text extraction, e.g., optical character recognition (OCR), applied to the nutrition facts box 112 of the label 100. The OCR technology can be used to process digital documents (PDFs, scanned documents, images of documents and the like), far more efficiently than humans. In a nutshell, OCR can "read" a document and convert images of text into actual text. Although many resources indicate that current state-of-the art OCR algorithms are capable of near-flawless recognition of printed text, with handwriting not too far behind, such effectiveness requires a stark contrast and/or perfect clean background. Further, the OCR technology performs very poorly when applied to an image that combines text and images. Accordingly, existing text extraction software still comes short of expectations when it comes to accuracy of character recognition in product labels. As illustrated in FIG. 2, much of the content commonly used in artwork labels, such as bold lettering, various combinations of letters and numbers to express nutritional content, measuring units, percentages, and portion content, is interpreted inaccurately by OCR and content that is, in fact, accurate is flagged as having errors.

Performance of the available OCR technology is greatly reduced when the text analyzed includes non-Latin characters. Moreover, the traditional OCR technology performance is decreased still further when the label includes non-Latin characters in combination with special characters. Capability of the traditional OCR technology may also be limited when applied to languages that use script written from right to left, such as Arabic, Hebrew, Farsi, and Kurdish.

The system of the present disclosure is configured to enable review of product labels that include one or more special characters in combination with non-Latin script and/or script written right-to-left.

Figure 3:
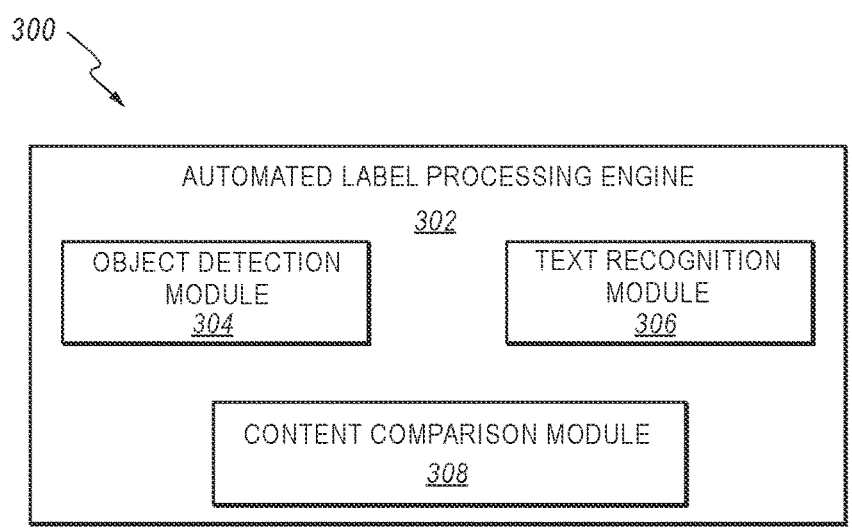
FIG. 3 is a block diagram illustrating an exemplary automated label processing engine for review the label of FIG. 1.

FIG. 3 illustrates an exemplary implementation 300 of an automated label processing engine (hereinafter, label processing engine) 302. The label processing engine 302 may analyze the input data using computer vision and perform optical character recognition using cognitive services.

The label processing engine 302 includes an object detection module 304, a text recognition module 306, and a content comparison module 308. The label processing engine 302 localizes and classifies components within the artwork image. In this way, the identified components will then be used by OCR technology to extract text from the image. As described in reference to at least FIGS. 4 and 5, the object detection module 304 and the text recognition module 306 of the label processing engine 302 may include deep learning models in combination with cognitive services to accurately detect objects and recognize and extract the text of those detected objects and analyze the content of the extracted text.

Figure 16:
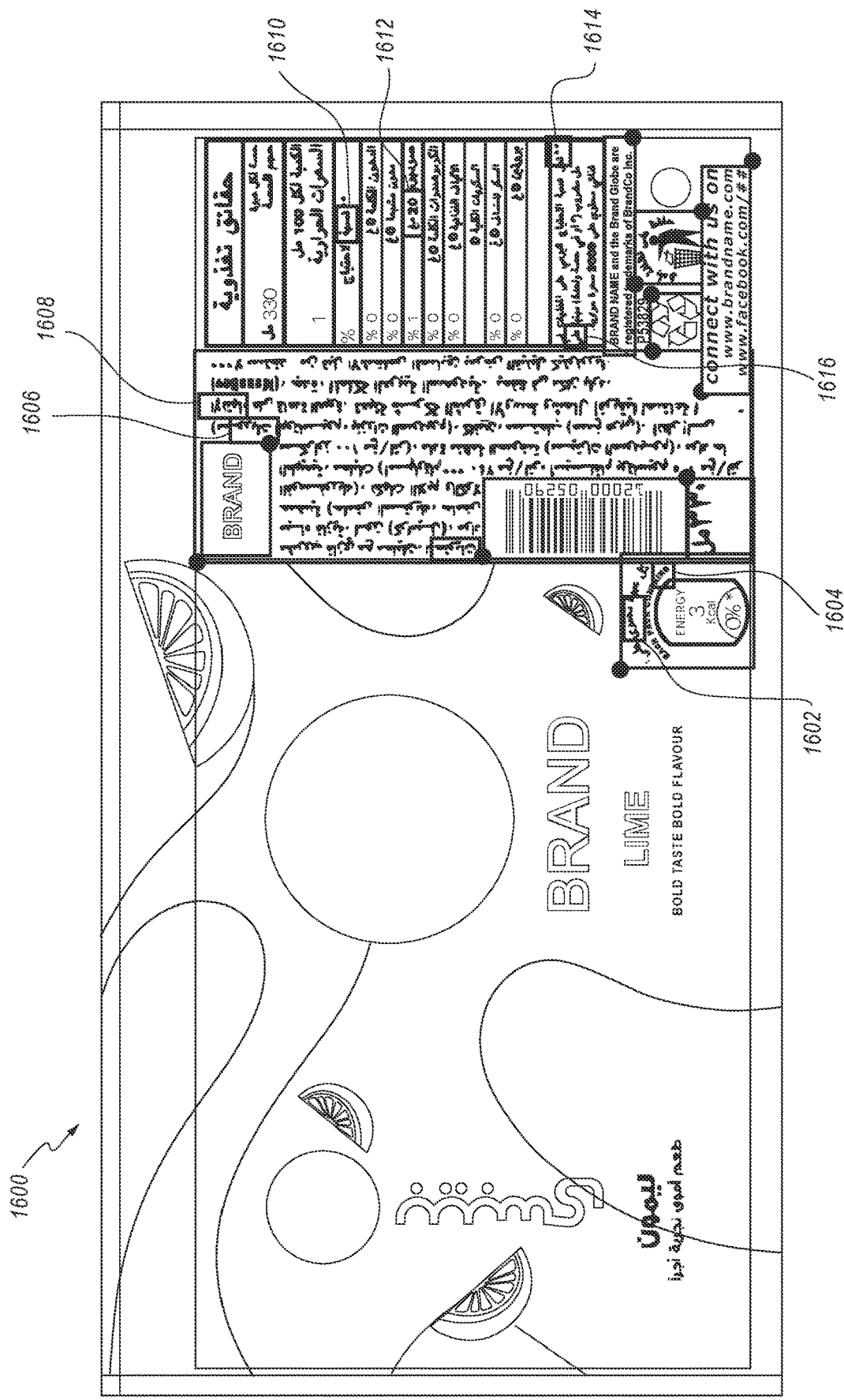
FIG. 16 is a block diagram illustrating an exemplary visual report layout for the machine learning-based product label review process.

The label processing engine 302 may be configured to generate a tabular and/or a visual comparison report (see, e.g., FIGS. 7 and 16) that specifically identifies any detected discrepancies and may highlight in different colors different categories of errors. With assistance from the machine learning-enabled label processing engine 302, a label review analyst may need to review only a small number of the labels, may limit their review to checking the results generated from the machine learning models, or may limit their review to the comparison report, each of which may reduce the amount of time the analyst may need to spend to check the labels for accuracy.

Figure 4A:
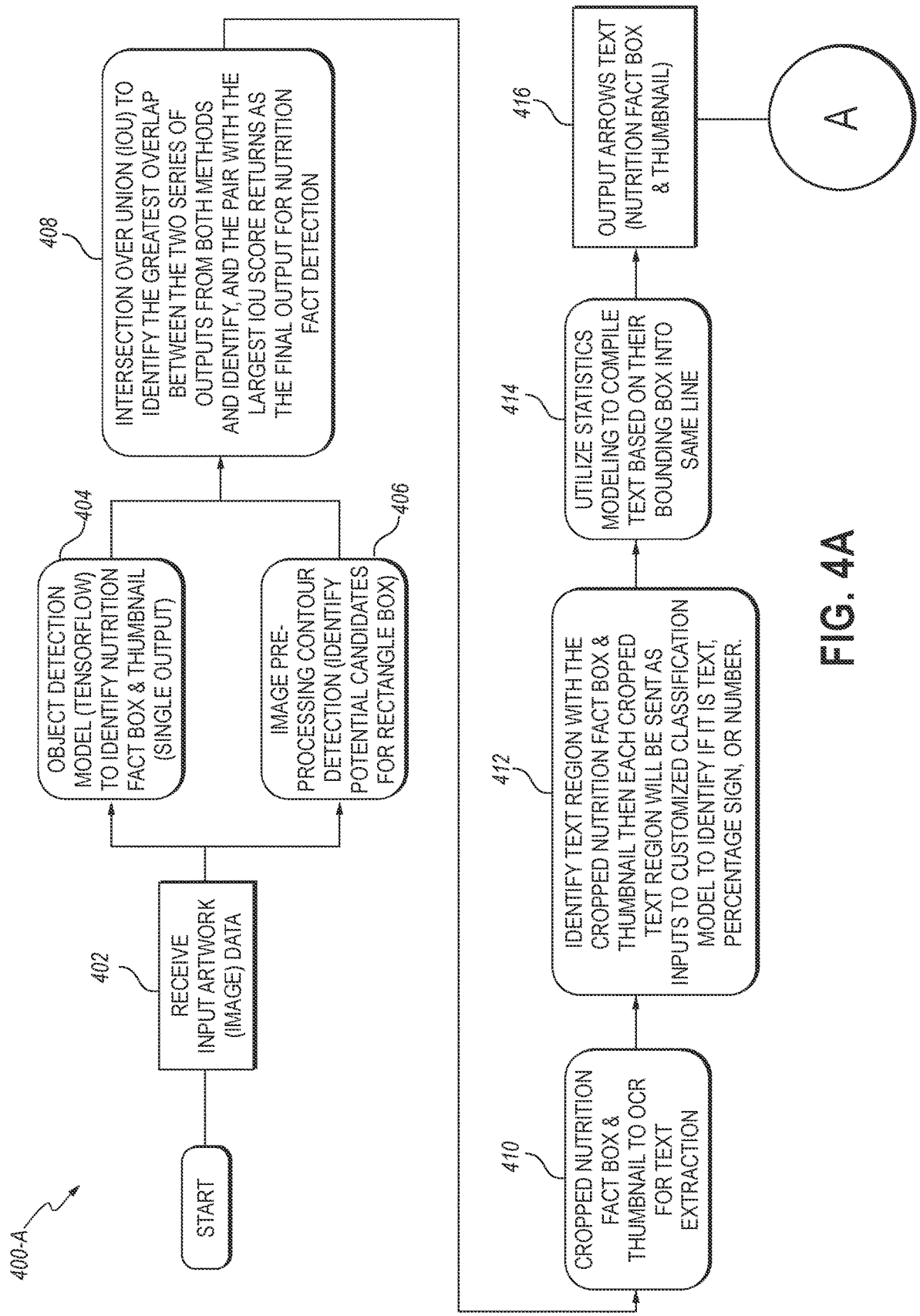
FIGS. 4A-4C are block diagrams illustrating exemplary process flowcharts for automating a product label review process using a combination of object detection and text extraction processes.
Figure 4B:
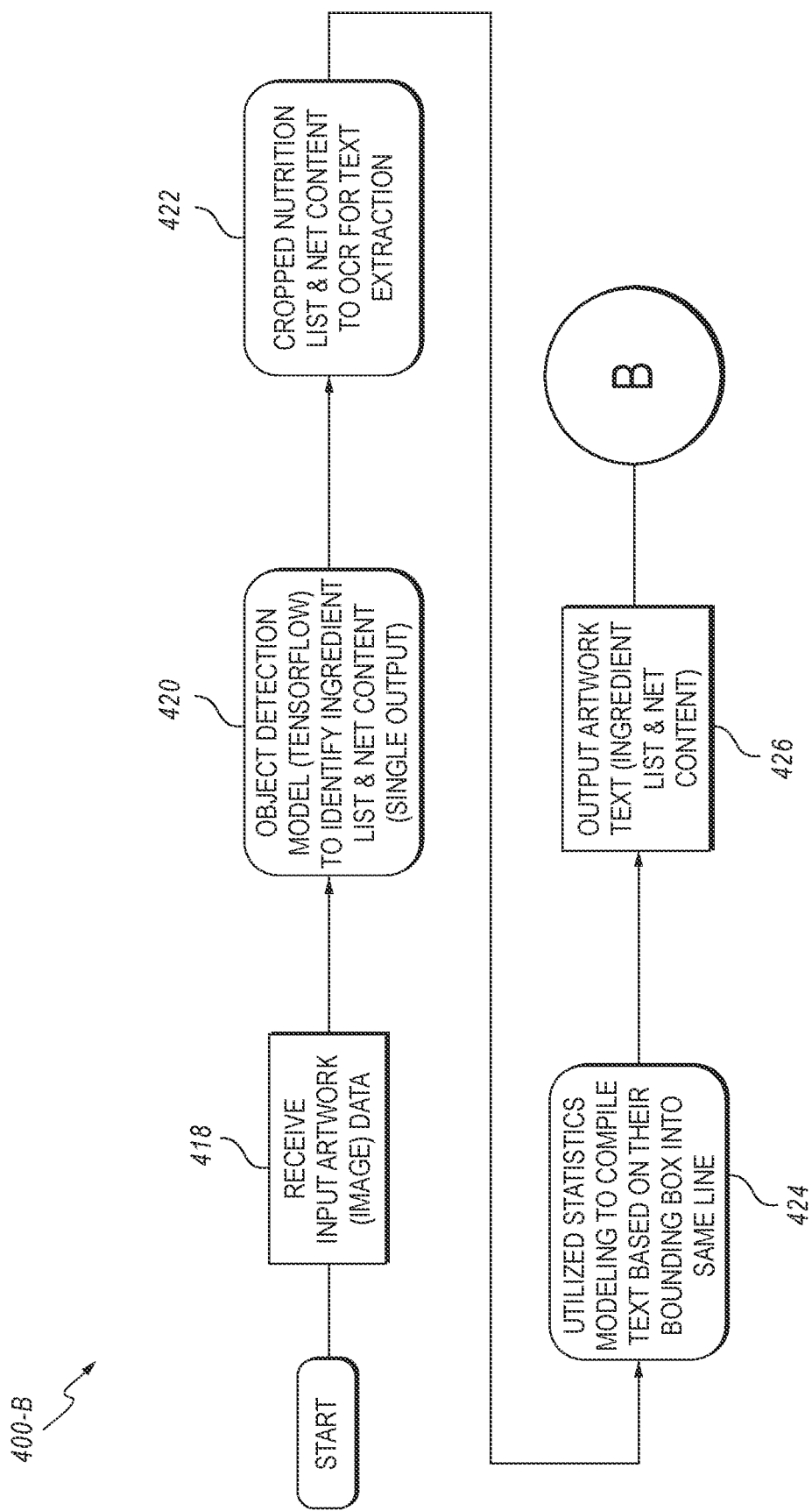
Figure 4C:
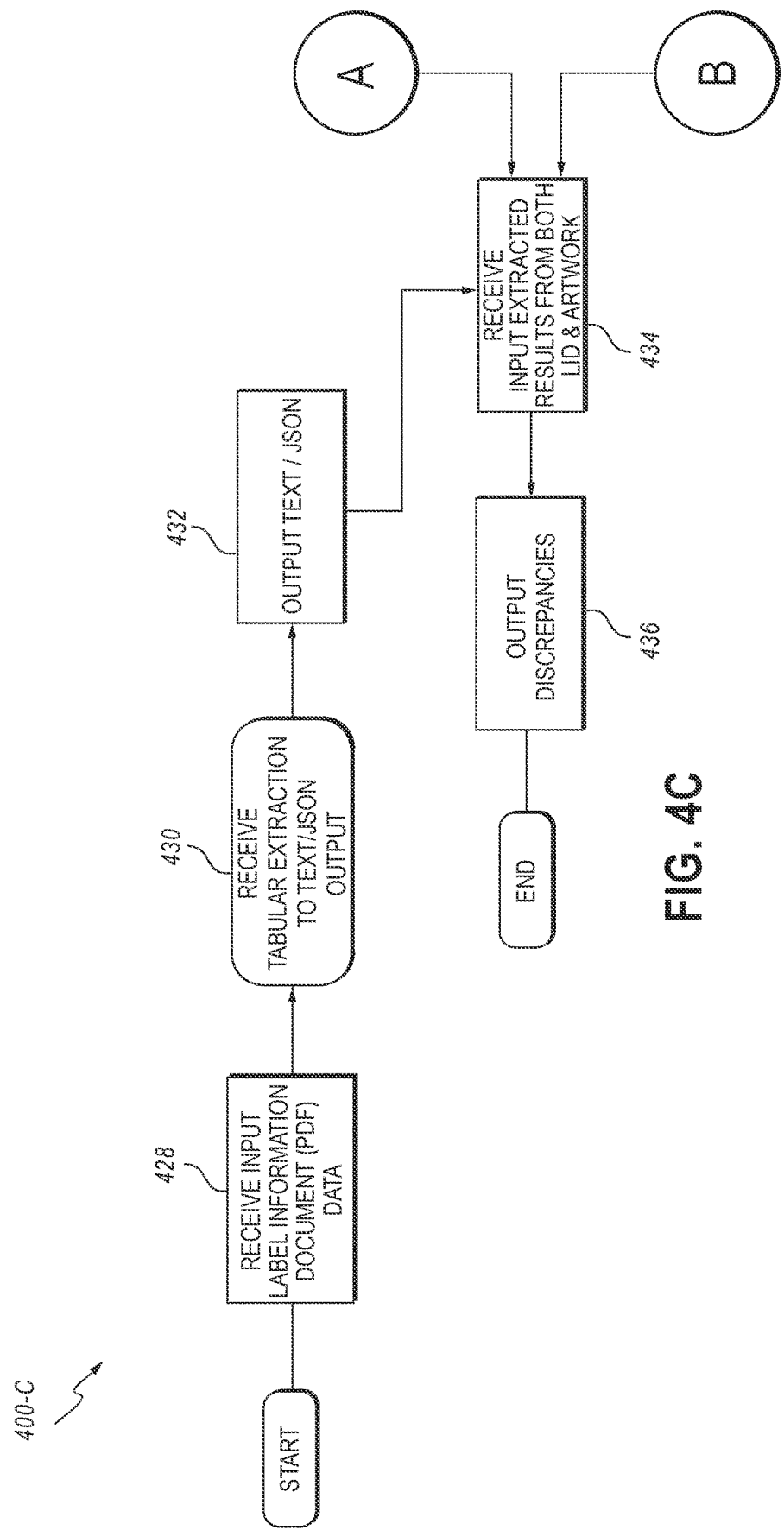

FIGS. 4A-4C illustrate exemplary processes 400-A, 400-B, and 400-C, respectively, for implementing a machine learning-enabled label review tool that may significantly reduce the amount of time spent reviewing the labels, as well as, eliminate errors that may occur during a manual review process. At a high level, each of the processes 400-A, 400-B, and 400-C includes stages directed to object detection, text detection and extraction, and comparison of the contents of the raw and baseline data.

The processes 400-A, 400-B, and 400-C may be executed by one or more components of the label processing engine 302 described in reference to FIG. 3. For example, once the object detection module 304 of the label processing engine 302 detects the components of the label 100, such as the thumbnail 108, the net content portion 110, a nutrition facts box 112, and the ingredients list 114, the text recognition module 306 of the engine 302 will automatically detect and extract the text displayed on the artwork label 100. The content comparison module 308 may then compare the extracted text with the information extracted from the LID 802 and/or information contained in one or more tables 1502, 1504, 1506, and 1508 of the baseline document 1500.

The process 400-A may begin in response to the label processing engine 302 receiving an input artwork label including an image of the artwork label 100 to be reviewed for accuracy and receiving an input baseline data comprising an image of the LID 802. In some instances, the input artwork label (also referred to as, raw data) and the LID (also referred to as, baseline data) are in a portable document format (PDF) and/or may comprise unstructured data. The label processing engine 302 may convert the artwork file to image files for further processing by deep learning algorithms based on image array input format. As one example, for the artwork input file in a PDF format, the label processing engine 302 may convert the PDF file to a high-resolution image format file, e.g., an image having a resolution including 600 dots per inch (DPI). The label processing engine 302 may be configured to convert the unstructured data into structured data format prior to initiating object detection and text recognition and extraction analysis.

The object detection module 304 may receive the artwork input data that has been converted into image format from PDF, at block 402. The object detection module 304 may analyze the received image data to detect and identify components of the label 100. For example, the object detection module 304, at block 404, applies a previously generated customized object detection model to identify a given detected object as either the nutrition facts box 112 or the thumbnail 108. As just one example, the customized object detection model may be trained using a pre-trained model in combination with a transfer-learning technique.

In one example, at block 404, the object detection module 304 performs contour detection to identify one or more objects within the image data that could become candidates for being bounding regions. The object detection module 304 then generates bounding boxes around each of the detected objects to provide a visual indication of a location of the object in the image. Each bounding box may be aligned to a predefined set of axis and may indicate coordinates for a plurality of sides of the box, thereby, specifying a position and scale of every instance of each object category or class. The label processing engine 302, at block 406, receives the bounding box coordinates resulting from one or more operations performed at block 404. The processing engine 302 may apply one or more image processing techniques to increase definition, precision, and clarity of the object within the bounding box.

At block 408, the object detection module 304 applies Intersection over Union (IOU) as an evaluation metric to the outputs of blocks 404 and 406. The IOU measures how the predicted area from object detection model, identified in a single output generated at block 404, and each predicted area, identified in the plurality of outputs generated at block 406 (predicted area from contour detection), overlap with each other. The object detection module 304 identifies a pair of outputs having the largest overlap (or the IOU score having the largest magnitude) as the cleanest version of the nutrition facts box 112 component of the label 100.

The object detection module 304 crops, at block 410, the nutrition facts box 112 and the thumbnail 108 identified in the input artwork data and passes the now-cropped nutrition facts box 112 and thumbnail 108 to the text recognition module 306. At block 412, the text recognition module 306 applies text recognition to identify a plurality of bound text regions in the nutrition facts box 112 and the thumbnail 108. As described in reference to at least FIG. 5, the text recognition module 306 applies a plurality of classification models to each of the identified (bound) text regions to determine whether the content of the text region is indicative of text (e.g., units), a percentage sign, or a number.

At block 414, the text recognition module 306 uses statistical modeling to reassemble the classified pieces of content of each bound text region into lines (sequences) of text. The text recognition module 306 then outputs, at block 416, the text of the nutrition facts box 112 and the thumbnail 108. In one example, the text recognition module 306 may output the text of the nutrition facts box 112 and the thumbnail 108 to block 434 of the process 400-C.

During the process 400-B, the label processing engine 302 identifies and processes the net content portion 110 and the ingredients list 114 components of the label 100. The object detection module 304 receives, at block 418, the artwork input data that has been converted from PDF to image format. The object detection module 304 may analyze, at block 420, the received image data to detect and identify the net content portion 110 and the ingredients list 114 components of the label 100 by applying a previously generated customized object classification model. (see, e.g., FIG. 5.)

The object detection module 304 crops, at block 422, the net content portion 110 and the ingredients list 114 identified in the input artwork data and passes the now-cropped net content portion 110 and ingredients list 114 to the text recognition module 306 for text extraction. As described in reference to at least FIG. 5, the text recognition module 306 applies one of a plurality of classification models to the extracted text to determine whether the content of the text region is indicative of text (e.g., units) or a number.

At block 424, the text recognition module 306 uses statistical modeling to reassemble the classified pieces of content of each bound text region into lines (sequences) of text. The text recognition module 306 then outputs, at block 426, the text of the net content portion 110 and the ingredients list 114. In one example, the text recognition module 306 may output the text of the net content portion 110 to block 434 of the process 400-C.

The process 400-C begins at block 428, where the label processing engine 302 receives the baseline data (e.g., the LID 802, the baseline document 1500) in a tabular format. The label processing engine 302, at block 430, applies tabular extraction to parse out the baseline nutrition facts box 804, the baseline net contents portion 806, the baseline ingredients list 808, and the baseline thumbnail 810 into an image format for further processing. For example, the label processing engine 432 may use a Java-based tabular extraction tool to parse out the content into JavaScript Object Notation (JSON) format. The parsed text is then output by the label processing engine 302 at block 432.

Figure 7:
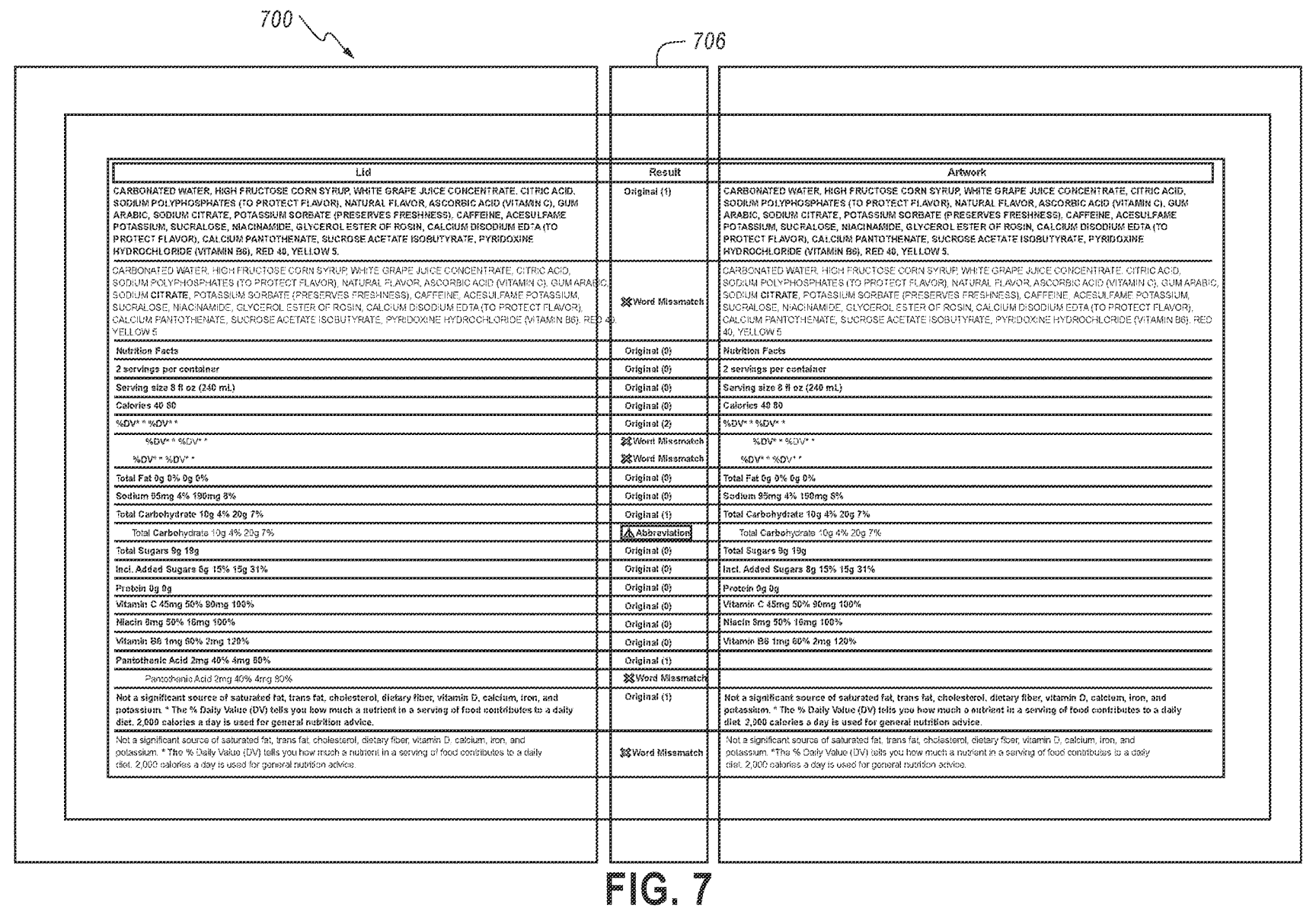

The content comparison module 308 receives as input, at block 434, extracted results of the input baseline data (e.g., LID) and the input raw data (e.g., the artwork label). The content comparison module 308 of the label processing engine 302 compares the sequence of the text extracted from both the LID 802 and artwork 100 using a sequence match model. The label processing engine 302 may identify whether corresponding portions of the artwork label 100 and the baseline information document 802, 1500 match. The label processing engine 302, at block 436, generates structured data format output to identify matching portions and further to identify portions that did not match. As illustrated in FIG. 7, the label processing engine 302 generates a report 700 that summarizes results of the comparison 706 between the received input raw data 704, on one side, and the received input baseline data 702, on the other side.

Figure 10A:
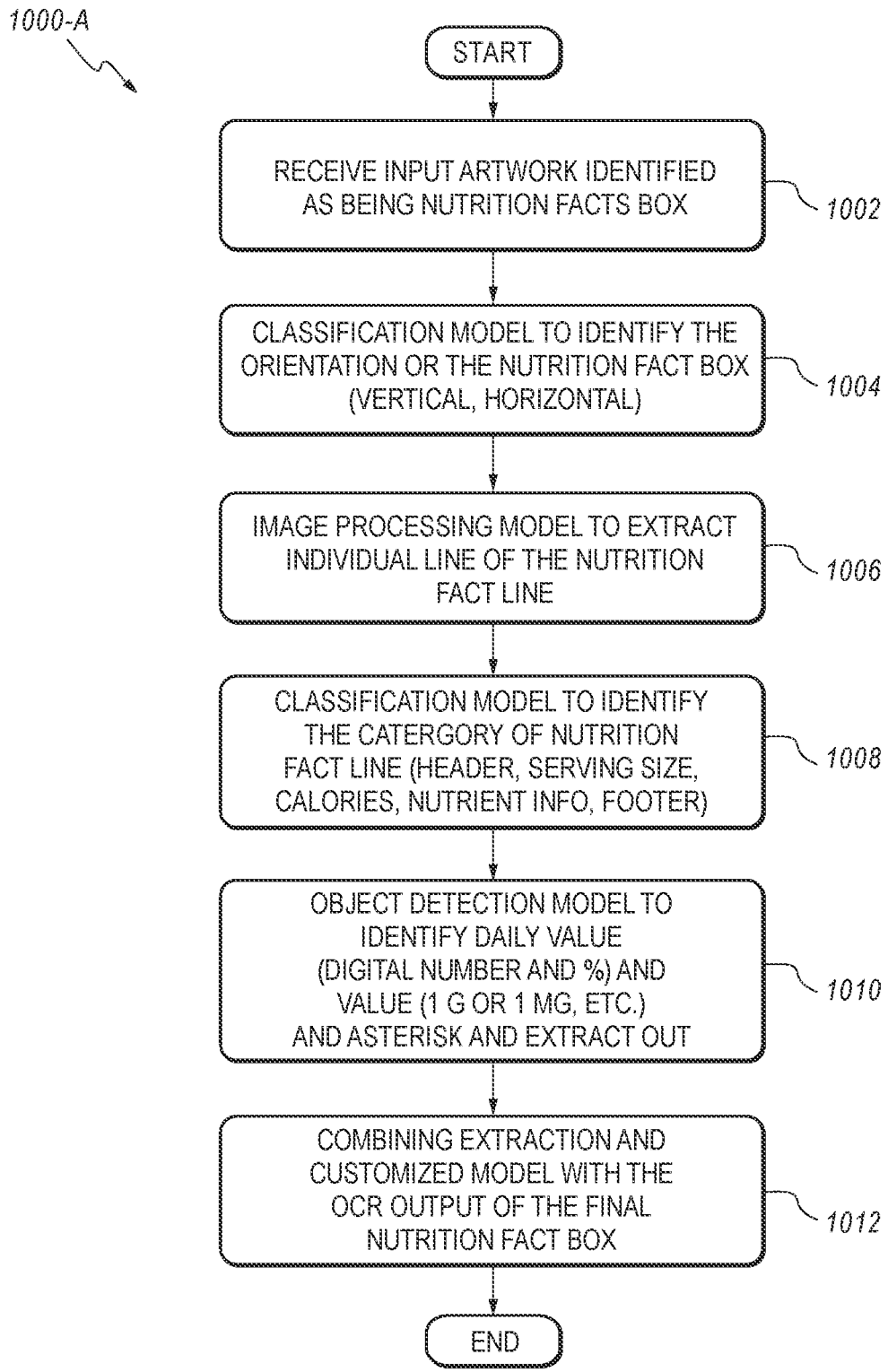
FIGS. 10A-10C are block diagrams illustrating exemplary process flowcharts for automating product label review of the exemplary product label of FIG. 9.
Figure 10B:
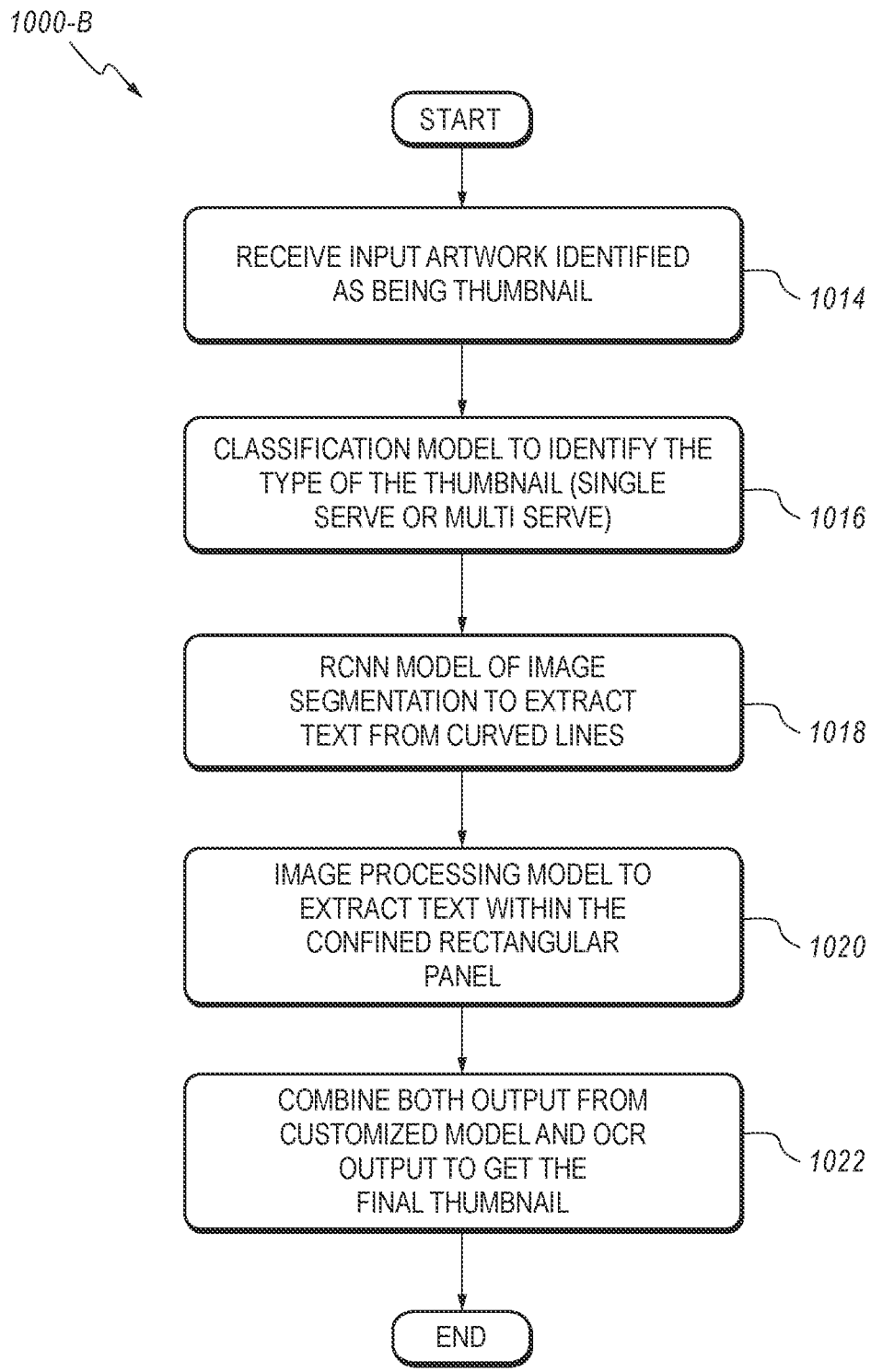
Figure 10C:
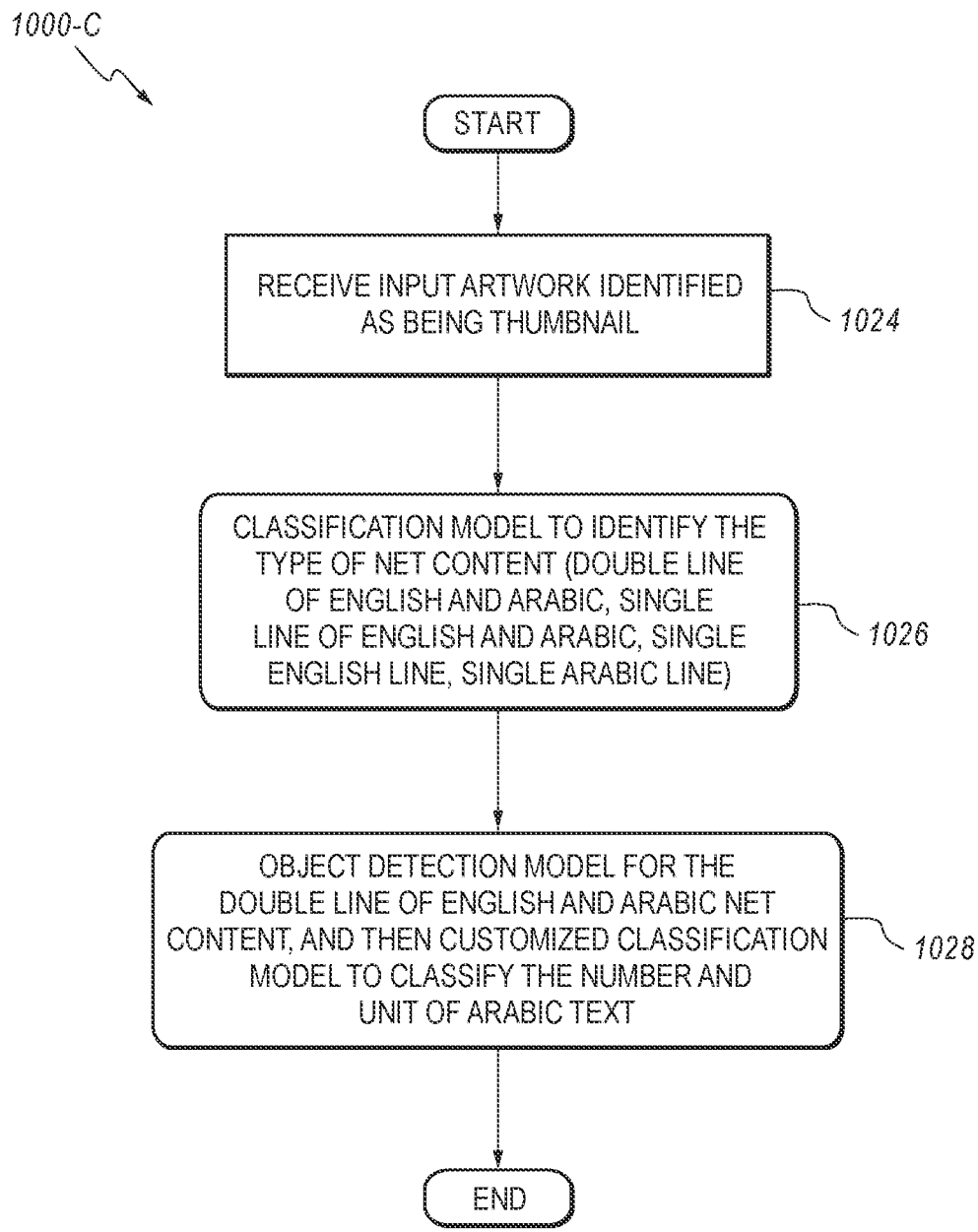

FIGS. 10A-10C illustrate exemplary processes 1000-A, 1000-B, and 1000-C, respectively, for implementing machine learning-enabled label review of the exemplary product label 900 including one or more special characters in combination with Latin and non-Latin script and/or script written right-to-left. Each of the processes 1000-A, 1000-B, and 1000-C includes stages directed to object detection and text detection and extraction of the contents of the raw and baseline data.

The processes 1000-A, 1000-B, and 1000-C may be executed by one or more components of the label processing engine 302 described in reference to FIG. 3. For example, once the object detection module 304 of the label processing engine 302 detects the components of the label 900, such as the thumbnail 908, the net content portion 910, a nutrition facts box 912, and the ingredients list 914, the text recognition module 306 of the engine 302 will automatically detect and extract the text displayed on the artwork label 900.

Output data generated by one or more of the processes 1000-A, 1000-B, and 1000-C may serve as input to a comparison process, e.g., the process 400-C described in reference to FIG. 4C, where the output data may be compared to baseline data to identify and annotate one or more discrepancies. In an example, the content comparison module 308 may then compare the extracted text with the information contained in one or more tables 1502, 1504, 1506, and 1508 of the baseline document 1500.

Figure 12:
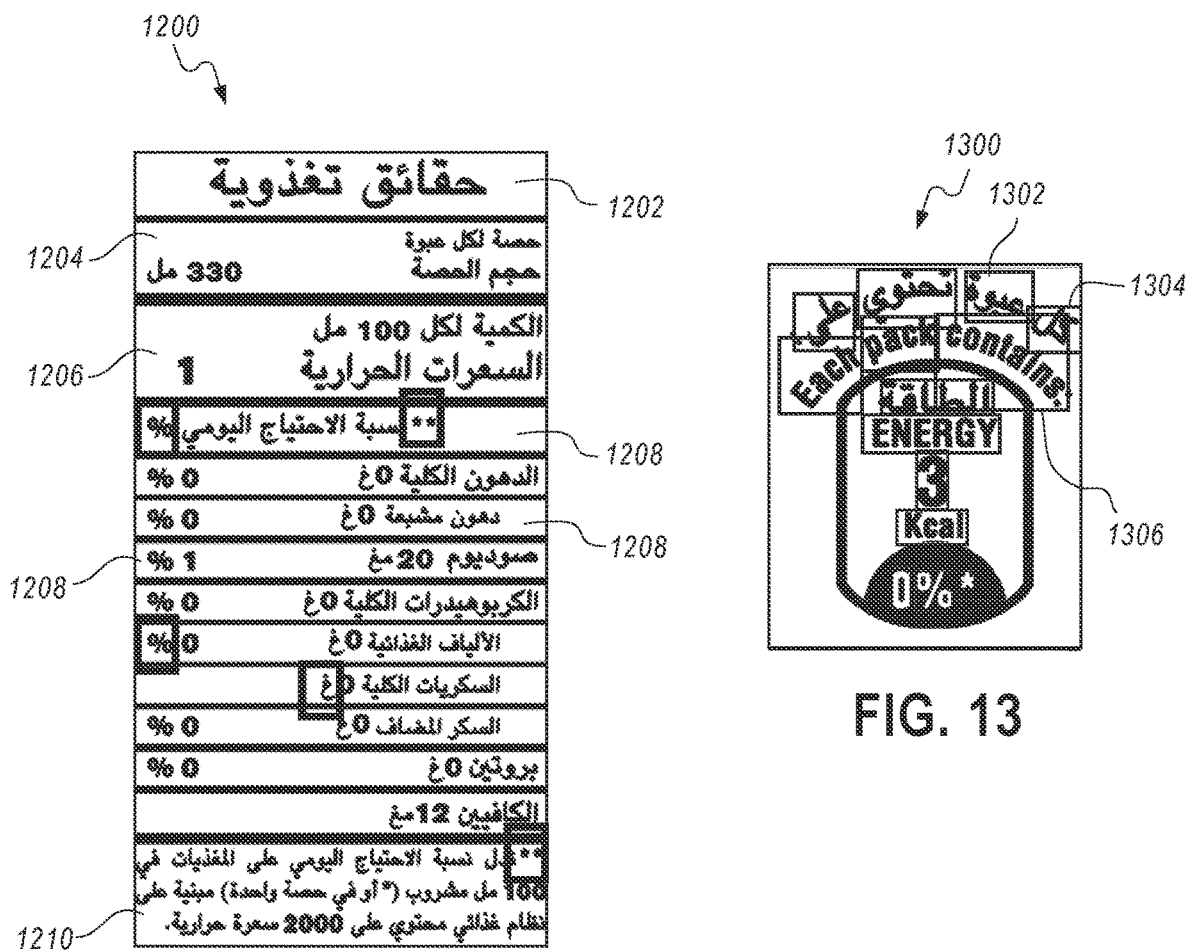
FIG. 12 is a block diagram illustrating a nutrition facts box of the exemplary product label of FIG. 9.

The process 1000-A may begin in response to the label processing engine 302 receiving, at block 1002, an input artwork including a portion of the artwork label 900, where the input artwork has been previously identified as being the nutrition facts box 912 (see, FIG. 12). In some instances, prior to receiving the input artwork identified as being the nutrition facts box 912, the object detection module 304 may perform one or more operations, such as converting received data from PDF to image and analyzing the image data to detect and identify, using a previously generated customized object detection model, one or more components of the label 900. At block 1004, the object detection module 304 applies to the input artwork identified as being the nutrition facts box 912 a classification model to identify an orientation, e.g., vertical or horizontal, of the received nutrition facts box 912.

The object detection module 304, at block 1006, applies image processing to extract one or more individual lines of the nutrition facts box 912. At block 1008, the object detection module 304 applies a customized classification model to each of the individual lines identified at block 1006 to determine a line category of that line, where the customized classification model may be trained using one or more operations described, for example, in reference to FIG. 6. As illustrated in FIG. 12, example line categories 1200 of the individual lines of the nutrition facts box 912 include a header line 1202, a serving size line 1204, a calories line 1206, one or more nutrient information lines 1208, and a footer line 1210. The object detection module 304, at block 1010, applies an object detection model to identify a daily value, e.g., a combination of a numeral and a percent sign "%", and a mass, volume, or other quantity, e.g., "1 g" or "1 mg". At block 1010, the object detection module 304 may also determine whether an asterisk is present on the analyzed line of the nutrition facts box 912. The object detection module 304 than extracts the identified daily value, a mass, volume or other quantity, and any asterisks if present. At block 1012, the object detection module 304 combines the extracted objects and the customized model with the OCR output of the final nutrition facts box 912.

Figure 13:
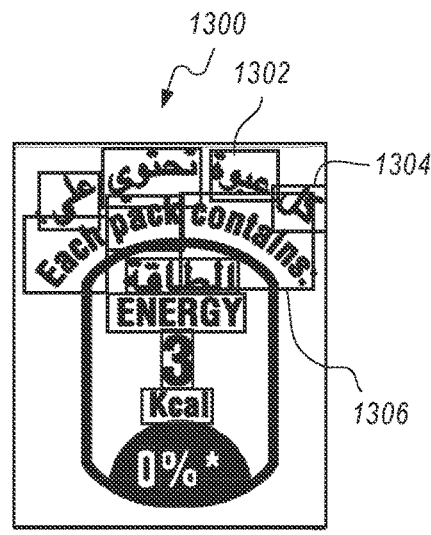
FIG. 13 is a block diagram illustrating a thumbnail of the exemplary product label of FIG. 9.

The process 1000-B begins at block 1014 where the object detection module 304 receives an input artwork including a portion of the artwork label 900 having been previously identified as being the thumbnail 908 (see, FIG. 13). At block 1016, the object detection module 304 applies to the input artwork identified as being the thumbnail 908 a classification model to identify a type of the received thumbnail 908, e.g., a single serving thumbnail or a multiple servings thumbnail.

The object detection module 304, at block 1018, applies an Region Based Convolutional Neural Networks (RCNN) model of image segmentation to extract text from curved lines of the received thumbnail 908 (see, e.g., FIG. 13, an example thumbnail 1300 having a plurality of text segments 1302, 1304, and 1306 extracted from curved lines). At block 1020, the object detection module 304 applies a customized image processing model to extract text located within a confined panel of the received thumbnail 908, where the customized image processing model may be trained using transfer-learning techniques applied to a pre-trained image processing model. At block 1022, the object detection module 304 combines the extracted text output by the customized model with the OCR output to generate a final version of the received thumbnail 908 that is ready to be compared to one or more tables of the baseline document 1500.

Figure 14:
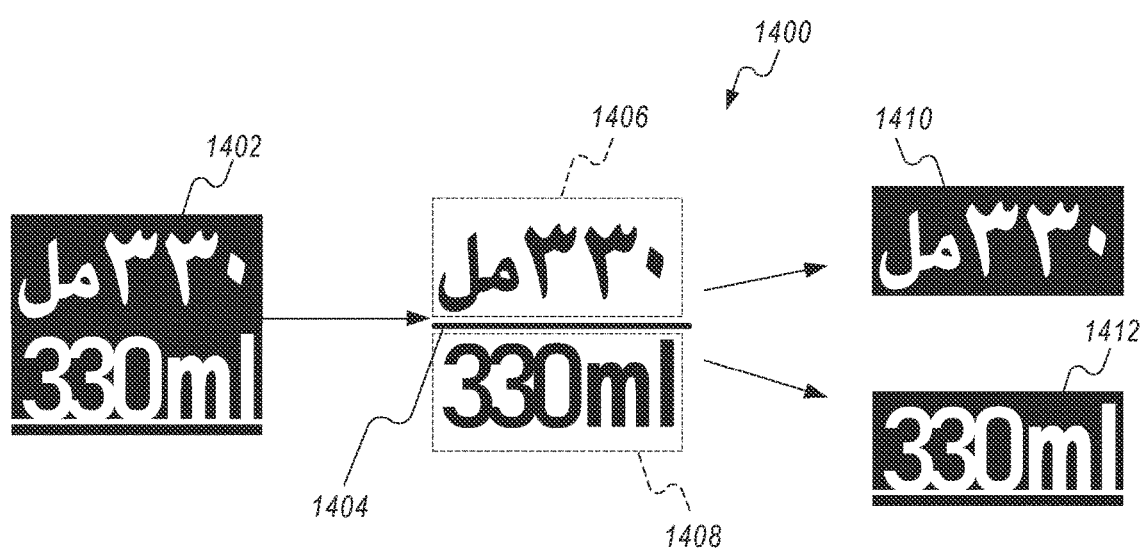
FIG. 14 is a block diagram illustrating a net content portion of the exemplary product label of FIG. 9.

The process 1000-C begins at block 1024 where the object detection module 304 receives an input artwork including a portion of the artwork label 900 having been previously identified as being the net content portion 910. At block 1026, the object detection module 304 applies to the input artwork identified as being the net content portion 910 a classification model to identify a type of the received net content portion 910, e.g., a double line of Latin and non-Latin script, a single line of Latin script, or a single line of non-Latin script. In response to detecting that the type of the received net content portion 910 is a double line of Latin-based and non-Latin-based script, the object detection module 304, at block 1028, applies the object detection model to separate the lines of Latin-based and non-Latin-bases script from one another. As illustrated, for example, in FIGS. 14A-14C, the object detection module 304 may analyze the net content portion having a double line of Latin-based and non-Latin-based script 1402 to identify a line of separation 1404 between a non-Latin based script line 1406 and Latin-based script line 1408. The object detection module 304 may then separate, along the line of separation 1404, the double line of Latin-based and non-Latin-based script 1402 into a non-Latin based script portion 1410 and Latin-based script portion 1412. Returning to FIG. 10C, the object detection module 304, at block 1028, may apply contour detection to identify and extract a measurement unit and the non-Latin numbers and apply a customized classification model to the identified non-Latin-based script portion to extract the text.

As discussed above, the output data of the processes 1000-A, 1000-B, and 1000-C may be compared to baseline data to identify and annotate one or more discrepancies. In an example, the content comparison module 308 may then compare the extracted text with the information contained in one or more tables 1502, 1504, 1506, and 1508 of the baseline document 1500. Additionally or alternatively, the label processing engine 302 generates a visual discrepancies report 1600 that provides visual indications discrepancy areas 1602, 1604, 1606, 1608 1610, 1612, 1614, and 1616, where the content of the product label 900 differs from that of the baseline document 1600.

Figure 5:
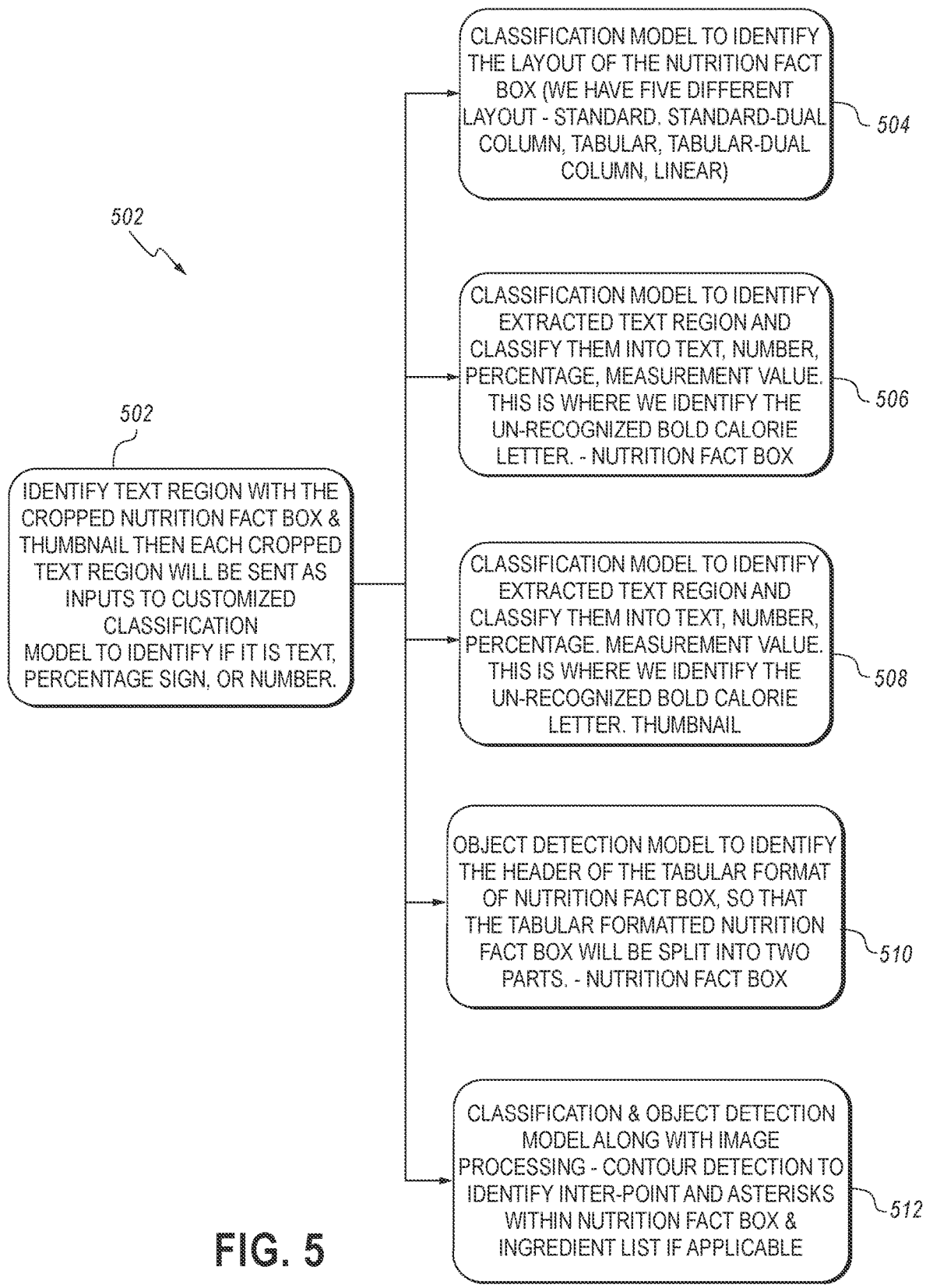
FIG. 5 is a block diagram illustrating an exemplary process flowchart for developing a plurality of classification and object detection models for applying machine learning-based object detection to product labels.

FIG. 5 illustrates an exemplary classification layout 500 including a plurality of classification and object detection models 504, 506, 508, 510, and 512 for identifying and analyzing various components of the artwork label 100 and the baseline information document 802. In one example, the models 504, 506, 508, 510 and 512 may be executed by one or more of the label processing engine 302, the object detection module 304, and the text recognition module 306.

As described in reference to at least FIG. 4, the label processing engine 302, at block 502, may apply one or more classification models 504, 506, 508, 510, and 512 to analyze detected components of the label 100 and/or analyze contents of the text extracted from the components of the label 100.

For example, the label processing engine 302 applies the classification model 504 to identify layout of the nutrition facts box 112. The label processing engine 302 may distinguish among a plurality of nutrition facts box layouts, such as, a standard layout comprising a table having a single column, a standard dual-column layout comprising nutritional breakdown per serving, in a first column, and per unit, in a second column, a tabular layout, a tabular-dual column layout, and a linear layout.

The label processing engine 302 applies the classification model 506 to extracted text of each identified region of the nutrition facts box 112 to classify the region as containing text, a number, a percentage sign, or a measurement value. The label processing engine 302 applies the classification model 508 to extracted text of each identified region of the thumbnail 108 to classify the region as containing text, a number, a percentage sign, or a measurement value.

The label processing engine 302 applies the object detection model 510 to identify a header of the nutrition facts box 112 having tabular layout, such that the tabular formatted nutrition facts box 112 may be split into two parts. The label processing engine 302 applies the classification and object detection model 512 along with image processing to detect contours and identify a decimal point and an asterisks within the nutrition facts box 112 and the ingredients list 114.

Figure 6:
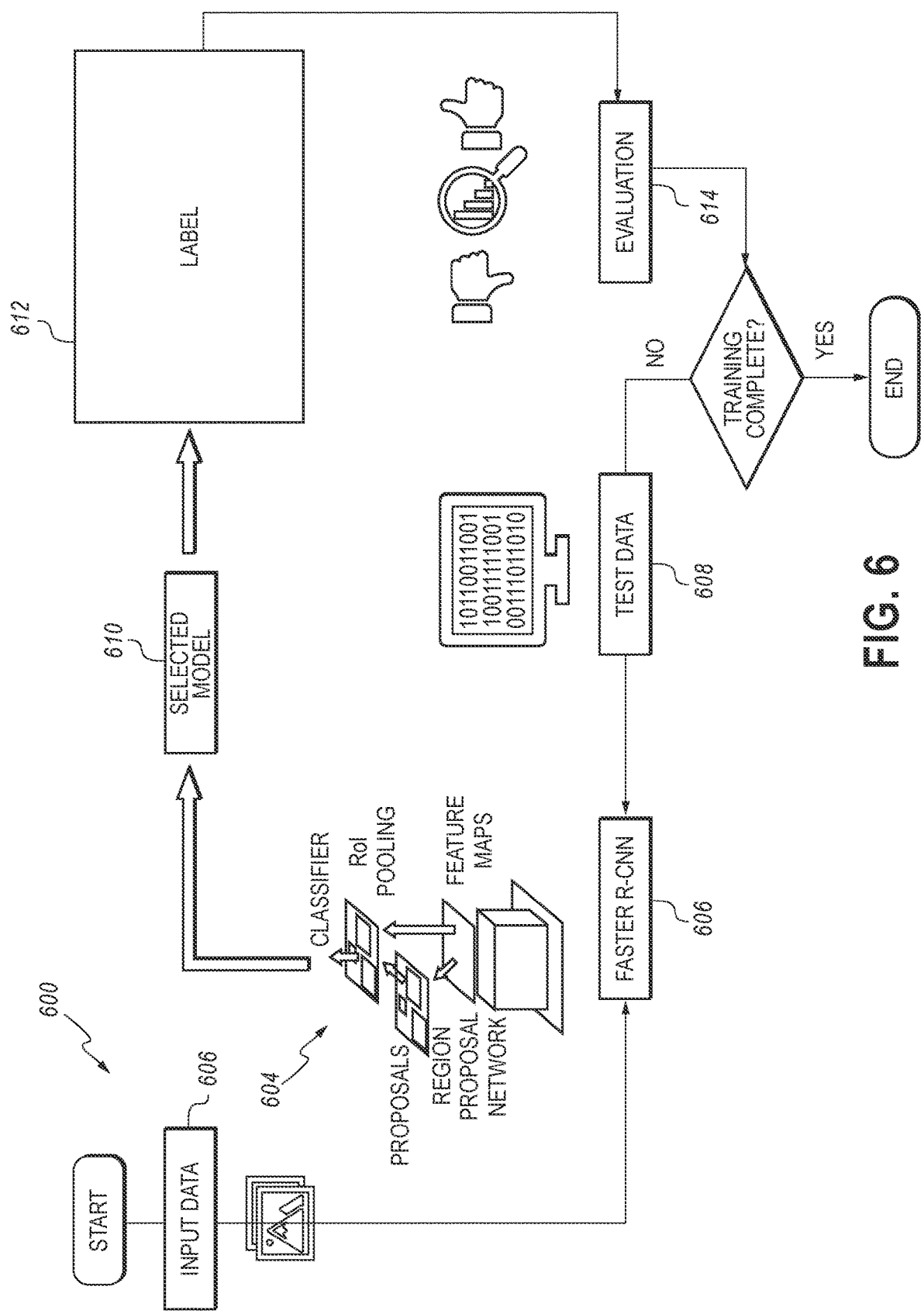
FIG. 6 is a block diagram illustrating an exemplary process flow for training a model for automated label review.

With reference to FIG. 6, a block diagram of a process flow 600 for training the classification and object detection models, such as the classification and object detection models 504, 506, 508, 510, and 512 described in reference to FIG. 5, is shown. The label processing engine 302 may be configured to execute process 600 to train a given classification and object detection model to identify and/or distinguish among one or more components of the label 100 and the LID 802, such as, but not limited to, the nutrition facts box 112, the ingredients list 114, the thumbnail 108, the net content portion 110, the baseline nutrition facts box 804, the baseline net contents portion 806, the baseline ingredients list 808, and the baseline thumbnail 810.

As shown at block 608, the data set to train the model (test data or training data) may comprise a predefined set of images, e.g., a predefined number of images from North America Beverages (excluding nutrition categories). Training the model using a training data set results in a more accurate output of the data augmentation process.

The label processing engine 302 may pre-train a convolutional neural network (CNN) on image classification tasks and then propose a plurality of regions by selective search, e.g., ~2 k candidate regions per image. The label processing engine 302 alters the pre-trained CNN by replacing the last max pooling layer of the pre-trained CNN with a region of interest (RoI) pooling layer that outputs fixed-length feature vectors of region proposals. The label processing engine 302 causes the network to replace a last fully connected layer and the last softmax layer (K classes) with a fully connected layer and softmax over K+1 classes. Finally, the model branches into two output layers: a softmax estimator of K+1 classes (same as in R-CNN, +1 is the "background" class), outputting a discrete probability distribution per RoI and a bounding-box regression model which predicts offsets relative to the original RoI for each of K classes. Sharing of the CNN computation for object proposals is a feature of the Fast R-CNN that greatly reduces the amount of time spent training the CNN since large amount of overlap exists in many region proposals of a given image.

Intersection over Union (IOU) may be used as an evaluation metric, at block 614. The IOU measures how the ground truth area and predicted area overlap with each other; the greater the overlap area the greater the accuracy. Before putting the data into the Faster R-CNN model, the data set may be split into a training and testing set, 80%, 20% respectively. The object detection module 304 uses the 80% of the data to train the model, while utilizing the validation set to optimize the loss function in order to obtain the final optimal model. The training process 600 may be stopped once the evaluation set reaches a predefined accuracy threshold, e.g., over 90%. The best model may then be selected as a final prediction model for the label review object detection task.

A fully convolutional network architecture based on VGG-16 with batch normalization may be adopted as a backbone. In a manner similar to U-net, the selected model may skip connections during a decoding portion of the process and may aggregate low-level features. The final output may comprise two channels as score maps: the region score and the affinity score. The automated label review process may further include applying a pairwise sequence alignment to a text sequence to identify which sequence positions are/were derived from a common ancestral sequence position. For example, a text sequence of the LID document is baseline data and, thus, serves as the ancestral sequence, while the text sequence from the artwork will be the current stage of sequence position.

FIG. 7 illustrates an exemplary report 700 indicating results 706 of a comparison between baseline extracted text 702 of the LID 802 and raw extracted text 704 of the artwork label 100.

Figure 11:
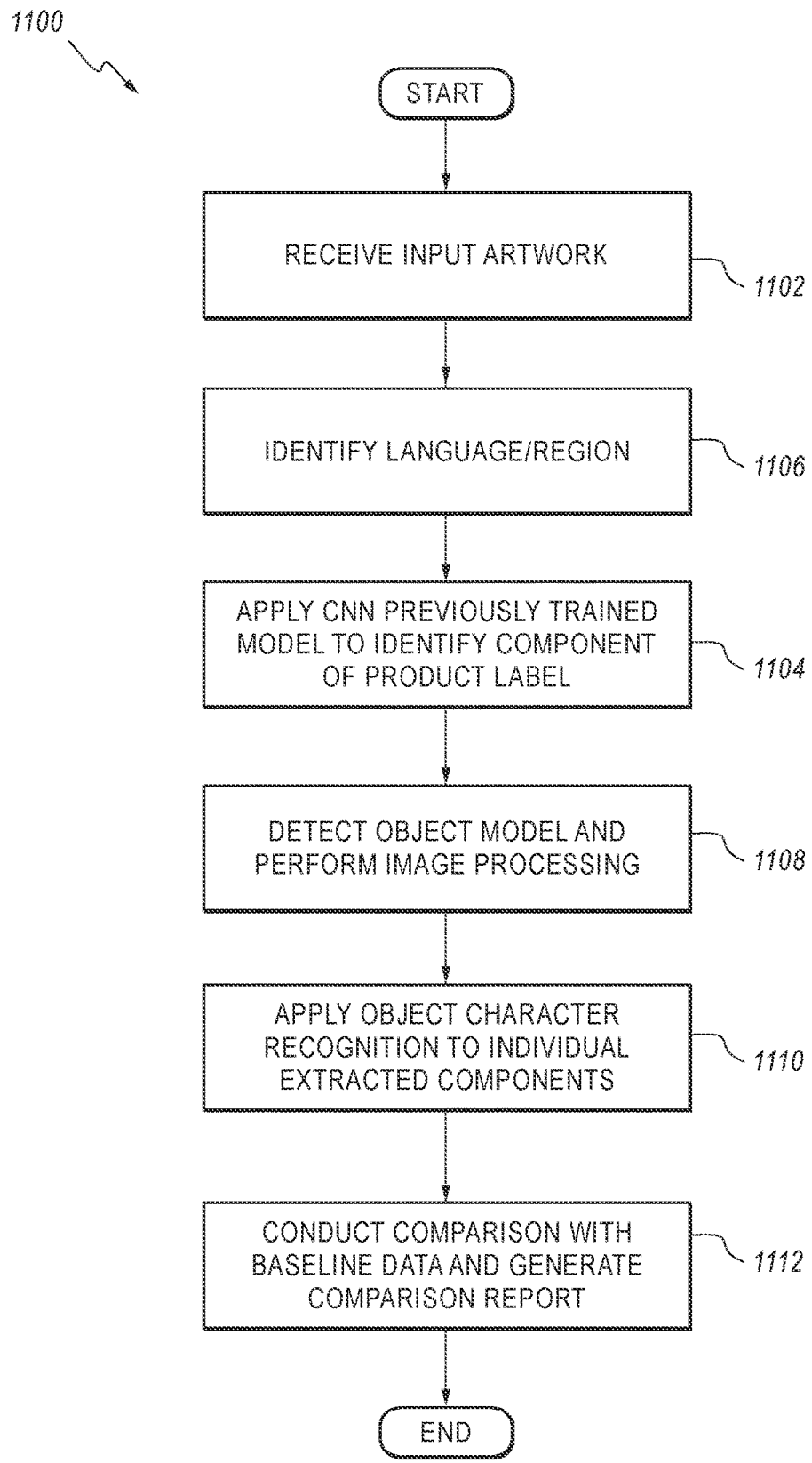
FIG. 11 is a block diagram illustrating an exemplary process flowchart for identifying a language and a region associated with a product label in accordance with the present disclosure.

FIG. 11 illustrates an exemplary process 1100 for implementing machine learning-enabled label review and baseline comparison of the exemplary product label 900 including one or more special characters in combination with Latin and non-Latin script and/or script written right-to-left. The process 1100 may be executed by one or more components of the label processing engine 302 described in reference to FIG. 3.

The process 1100 may begin at block 1102 where the label processing engine 302 receives an input artwork including a portion of the artwork label 900. At block 1104, the label processing engine 302 identifies at least one of a geographic region and a market associated with the received input artwork. While not separately illustrated with reference to FIGS. 4A and 4B, the label processing engine 302 may be configured to identify at least one of a geographic region and a market associated with the received input artwork prior to performing operations 404 and 420, respectively.

At block 1106, the label processing engine 302 may perform one or more operations, such as converting received data from PDF to image and analyzing the image data using a previously generated customized object detection model, to detect and identify one or more components of the label 900. The label processing engine 302, at block 1108, detects an object model and performs image processing of the input artwork based on the object model.

At block 1110, the label processing engine 302 applies object character recognition to each of the extracted components of the input artwork. The label processing engine 302, at block 1112, compares object and character data in the baseline document to the object and character data in the received input artwork and generates a report of one or more discrepancies based on the results of the comparison, such as generates the exemplary report 700 described in reference to FIG. 7 and/or generates the visual report 1600 described in reference to FIG. 16. In some instances, at block 1112, the label processing engine 302 performs one or more checks or applies one or more business rules related to the one of the geographic region or the market associated with the input artwork.

Advantageously one of skill will appreciate that the described automated product label review reaps great benefits over the currently existing manual process. A manual label review may include receiving an email notification when the design studio queues a new artwork label to be reviewed for accuracy. The review analyst may use the artwork label and may identify the corresponding LID to conduct the comparison. The analyst will manually compare each element of the artwork with the LID and then type out the comments of where it has discrepancies if applicable and send back to the design studio for correction. The manual review comparison process of the proposed label with the LID can may take about 10-15 minutes; whereas, for artwork, if it is an existing artwork it may take about 10-15 minutes to review, and may take about 30-45 minutes to review if it is a new design. The review time also greatly depends on the complexity of the artwork and the ingredients listing, among other things. Many manual steps are involved that potentially leads to human error; therefore, streamlining the process can greatly benefit the work flow.

While the machine learning enabled tool helps to reduce the label review time, improve review accuracy and thus increase the throughput, the saved time helps in speed to market and better time usage. Leveraging the software capabilities minimizes the risks of mistakes and helps avoid the costs of recalls caused by packaging label error and associated costs of packaging destruction.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A system for analyzing a product label, the system comprising:
   a label processing engine configured to:
      receive a first input including raw data representative of the product label and a second input including baseline data;
      detect a raw data object within the raw data, classify the raw data object into a first class of a plurality of classes by associating the raw data object with the first class, and localize the raw data object within the raw data;
      detect a baseline data object within the baseline data, classify the baseline data object into a second class of the plurality of classes by associating the baseline data object with the second class, and localize the baseline data object within the baseline data;
      recognize corresponding text within the raw data object and the baseline data object and extract the corresponding text within the raw data object and the baseline data object;
      reassemble the corresponding text of the raw data object and the baseline data object into respective lines of text;
      compare the respective lines of text with one another; and
      one of,
         issue a first notification indicating that the respective lines of text match in response to determining that the respective lines of text match, and
         issue a second notification indicating that the respective lines of text do not match in response to determining that the respective lines of text do not match,
   wherein the label processing engine is further configured to perform contour detection to generate a plurality of candidate bound regions within data of each of the raw data input and the baseline data input and classify as a nutrition facts box one of the plurality of candidate bound regions based on a magnitude of an overlap between the one of the plurality of candidate bound regions and a proposed region generated by an customized object detection model of the label processing engine.

2. The system of claim 1, wherein to extract the corresponding text within the raw data object and the baseline data object comprises to identify whether the corresponding text comprises one of a text sequence, a number, a percentage, and a measurement unit.

3. The system of claim 1, wherein, prior to detecting, the label processing engine is further configured to convert each of the raw data and the baseline data from a first format into a second format, and wherein the first format comprises a portable document format and the second format comprises a high-resolution image format.

4. The system of claim 1, wherein the raw data comprises a nutrition label and the baseline data comprises a label information document.

5. The system of claim 1, wherein the raw data object is a nutrition facts box and the baseline data object is a baseline nutrition facts box.

6. The system of claim 1, wherein the baseline data is tabulated.

7. The system of claim 6, wherein the label processing engine is further configured to, prior to detecting the baseline data object, convert the tabulated baseline data from a Java-based tabulated format into a JavaScript Object Notation (JSON) format.

8. The system of claim 1, wherein prior to classifying the raw data object, the label processing engine is configured to identify one of a region and a market associated with the raw data object, and wherein classifying the raw data object into the first class includes classifying the raw data object according to the identified one of the region and the market.

9. A method for processing a product label, the method comprising:
receiving, by a label processing engine, a first input including raw data representative of the label and a second input including baseline data;
detecting a raw data object within the raw data, classifying the raw data object into a first class of a plurality of classes by associating the raw data object with the first class, and localizing the raw data object within the raw data;
detecting a baseline data object within the baseline data, classifying the baseline data object into a second class of the plurality of classes by associating the baseline data object with the second class, and localizing the baseline data object within the baseline data;
recognizing corresponding text within the raw data object and the baseline data object and extracting the corresponding text within the raw data object and the baseline data object;
reassembling the corresponding text of the raw data object and the baseline data object into respective lines of text;
comparing the respective lines of text with one another; one of,
issuing a first notification indicating that the respective lines of text match in response to determining that the respective lines of text match, and
issuing a second notification indicating that the respective lines of text do not match in response to determining that the respective lines of text do not match; and
performing, via the label processing engine, contour detection to generate a plurality of candidate bound regions within data of each of the raw data input and the baseline data input and classify as a nutrition facts box one of the plurality of candidate bound regions based on a magnitude of an overlap between the one of the plurality of candidate bound regions and a proposed region generated by an customized object detection model of the label processing engine.

10. The method of claim 9, wherein extracting the corresponding text within the raw data object and the baseline data object comprises identifying whether the corresponding text comprises one of a text sequence, a number, a percentage, and a measurement unit.

11. The method of claim 9 further comprising, prior to detecting, converting each of the raw data and the baseline data from a first format into a second format, and wherein the first format comprises a portable document format and the second format comprises a high-resolution image format.

12. The method of claim 9, wherein the plurality of classes are a nutrition facts box, a thumbnail, an ingredients list, and a net contents portion.

13. The method of claim 9, wherein the raw data comprises a nutrition label and the baseline data comprises a label information document.

14. The method of claim 13 further comprising, prior to detecting the baseline data object, detecting that the baseline data is tabulated and converting the tabulated baseline data from a Java-based tabulated format into a JavaScript Object Notation (JSON) format.

15. A system for processing a product label, the system comprising:
an object detection module configured to, in response to receiving a raw data input and a baseline data input, detect corresponding objects within data of each of the raw data input and the baseline data input, and classify the corresponding objects using a customized object detection model;
a text recognition module configured to, in response to receiving the corresponding objects, recognize text in each of the corresponding objects and extract the text to classify the text using a customized classification model; and
a content comparison module configured to compare the text of the corresponding objects with one another, using a character-by-character approach, and issue a notification in response to one of identifying a discrepancy or identifying a match,
wherein to detect and classify the corresponding objects comprises to perform contour detection to generate a plurality of candidate bound regions within data of each of the raw data input and the baseline data input and classify as a nutrition facts box one of the plurality of candidate bound regions based on a magnitude of an overlap between the one of the plurality of candidate bound regions and a proposed region generated by the customized object detection model.

16. The system of claim 15, wherein the magnitude of the overlap is indicative of an intersection over union (IOU) score.

17. The system of claim 15, wherein to classify as the nutrition facts box includes to select the overlap having a highest magnitude.

18. The system of claim 15, wherein the object detection module is further configured to detect a layout of the nutrition facts box as being one of a standard layout, a standard dual-column layout, a tabular layout, a tabular-dual column layout, and a linear layout.

19. The system of claim 15, wherein to extract the text to classify the text using the customized classification model includes to classify the text as being one of a text sequence, a number, a percentage, and a measurement unit.

* * * * *